United States Patent

[11] 3,600,691

| [72] | Inventor | William P. Caywood, Jr.<br>Murrysville, Pa. |
|---|---|---|
| [21] | Appl. No. | 839,828 |
| [22] | Filed | July 8, 1969 |
| [45] | Patented | Aug. 17, 1971 |
| [73] | Assignee | The United States of America as represented by the Secretary of the Army |

[54] SYNCHRONOUS DEMODULATOR
8 Claims, 6 Drawing Figs.

[52] U.S. Cl. .................................................... 328/133,
307/233, 307/321, 328/208, 329/50, 332/43 B
[51] Int. Cl. ...................................................... H03b 3/04
[50] Field of Search........................................... 328/133,
134, 208; 329/50, 166; 332/43 B, 47; 307/34, 233

[56] References Cited
UNITED STATES PATENTS

| 2,562,912 | 8/1951 | Hawley.......................... | 329/50 X |
| 3,193,773 | 7/1965 | Uglum et al. ................. | 329/166 X |
| 3,390,343 | 6/1968 | Carter........................... | 328/133 X |
| 3,436,685 | 4/1969 | Mack............................ | 328/133 X |

Primary Examiner—Roy Lake
Assistant Examiner—James B. Mullins
Attorneys—Harry M. Saragovitz, Edward J. Kelly, Herbert Berl and Edward P. Barthel ABSTRACT: A synchronous demodulator which when supplied at its two sets of input terminals with two signals that are of different frequencies, develops at its output terminals, through a pair of oppositely poled demodulator bridges, a signal that includes the sum frequency and difference frequency of the two inputs.

PATENTED AUG 17 1971 3,600,691

WILLIAM P. CAYWOOD, JR.
INVENTOR.

BY H. M. Saragovitz
E. J. Kelly, H. Berl
and E. P. Barthel
ATTORNEYS

SYNCHRONOUS DEMODULATOR

This invention relates to a synchronous demodulator. More particularly, this invention relates to a synchronous demodulator which functions as an electrical summing and mixing circuit. In the past, ground vehicles were commonly designed with driving power being distributed from an internal combustion engine through a transmission system and then to a mechanical shaft or axle which turned the vehicle's wheels. To improve flexibility and control, a driving system was desired which permitted individual control of each wheel. A suitable system meeting this requirement is an electric drive system which incorporates a drive motor in each wheel. To provide suitable control for these motors, a comparison must continually be made between the desired and actual speed of the respective wheels. In order to make this comparison and obtain necessary control signals, the present invention was designed which can be used in AC electric drive vehicle for obtaining the algebraic summation of wheel motor speed signals and slip frequency generator signals. The desired circuit for this function is an electrical synchronous demodulator circuit which is capable of receiving at its inputs two signals of different frequencies and delivering at its output a signal whose fundamental frequency is equal to the difference between two input frequencies. It has heretofore been the practice to design electronic synchronous demodulating circuits, either with diodes as keying devices, with attenuating low efficiency, or with amplifying elements as keying devices with an attendant high cost.

It is therefore the principal object demodulator this invention to provide a new and improved synchronous demodulator circuit that generates a difference frequency when supplied secondary input signals each having a different periodicity from the other.

It is another object of this invention to provide a synchronous demodulator circuit that yields at its output terminals a signal power equal to the sum of nearly all of the signal power and the reference signal power supplied at their respective input terminals.

It is still another object of this invention to provide a synchronous demodulator circuit that utilizes no amplifying devices, but rather comprises only capacitances, inductances, and diode devices.

It is yet another object of this invention to provide a circuit in accordance with the foregoing objects that can operate at high power levels of input and output signals.

It is another object of this invention to provide a synchronous demodulator circuit that allows the two input signals to be supplied at any desired voltages or currents, yet have the output signal of the demodulator be of a different voltage or current.

Other objects and advantages of the present invention will become apparent to those of in the art by the following description when considered in relation to the accompanying drawing of which:

Briefly, in accordance with the invention, a synchronous demodulator has been provided comprising first ans second input means having first and second input signals of different frequencies which are applied to first and second demodulator bridge circuits. By alternately rendering the bridge circuits conductive and nonconductive, the output signal has a fundamental frequency equal to the difference between the frequencies of the two inputs.

Figure 1:
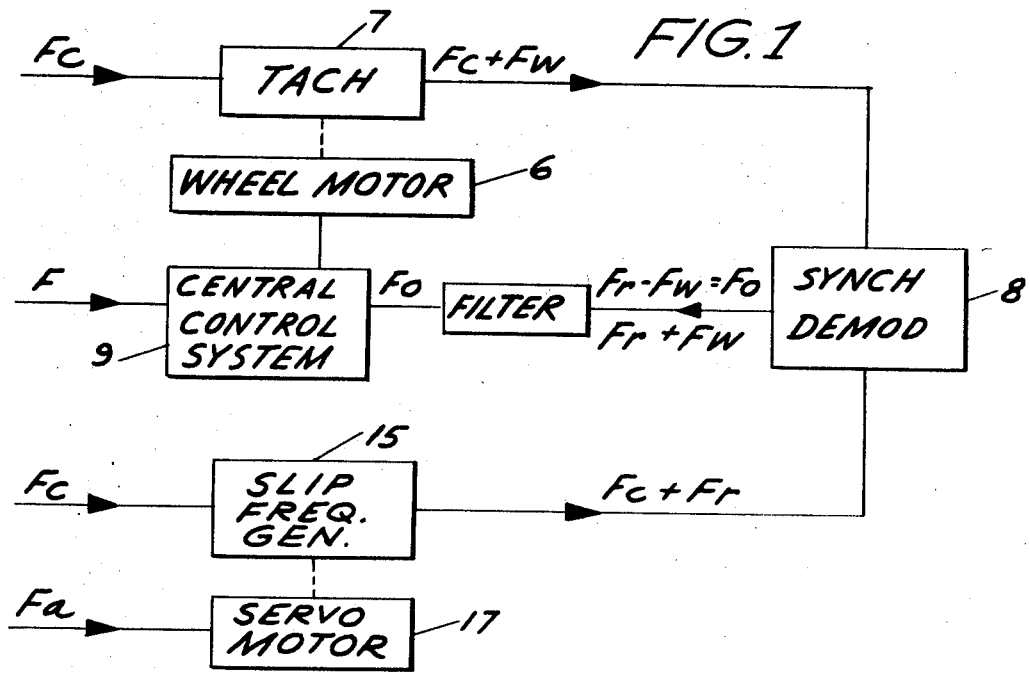
FIG. 1 is a block diagram of a general overall vehicle system which could incorporate a circuit according to the invention.

Referring now to the drawings, wherein the similar numerals will refer to similar parts in the various figures, a block diagram of a system incorporating a circuit according to the invention is shown in FIG. 1. A motor vehicle wheel having an electric motor inserted therein is shown schematically at 6 in FIG. 1. This motor is energized by a suitable frequency f, thereby controlling the speed of the vehicle. Suitably attached to the wheel motor 6 is a wheel motor tachometer 7. Tachometer 7 may be mounted on the same shaft as the wheel motor 6. Tachometer 7 functions as an electromechanical modulator which modulates the carrier frequency $f_c$ by the modulating signal $f_w$. Frequency $f_w$ is the frequency of the signal which is dependent upon the rotational velocity of wheel motor 6. As wheel motor 6 increases in velocity, the rotor of tachometer 7 similarly increases in rotational velocity, and hence, the frequency $f_w$ increases.

The carrier frequency $f_c$ is simultaneously applied to a slip frequency generator 15 which also functions as an electromechanical modulator. The modulating reference signal $f_r$ is dependent upon rotational velocity of driving servo motor 17 which is normally driven at a rotational velocity having nominal velocity of 0.1—2 cycles per second. The input signal to servo motor 17 has a frequency $f_o$ and is part of the central control system. The output of slip frequency generator 15, which is basically a three phase rotary transformer, is shown as having a frequency of $f_c+f_r$.

Both of the signals from the respective electromechanical modulators 7 and 15 are fed to the synchronous demodulator 8 according to the invention. The output signal from synchronous demodulator 8 appears as having a frequency equal to the sum and difference of the two input signals $f_r$ and $f_w$. Due to the balanced nature of synchronous demodulator 8, carrier frequency $f_c$ is cancelled, thereby resulting in only the two modulating signals having a frequency of $f_r$ and $f_w$. The output of synchronous demodulator 8 is fed through a filter wherein the ripple component $f_r+f_w$, or the summation frequency is removed by filtering. This results in fundamental output signal $f_o$ which has a frequency equal to the difference of the two input signals $f_r$ and $f_w$. The fundamental output signal $f_o$ thereby provides a three phase low frequency reference which is fed to frequency changer included in the central control system 9, wherein low frequency $f_o$ is compared to high frequency f, which is the frequency of the signal controlling the wheel motor Control system 9 incorporates gating devices such as silicon control rectifiers (S.C.R.'s), which are inserted in the circuit to interrupt main signal $f$ supplied to the wheel motor 6. The firing angle of the angle of the respective of the S.C.R.'s and resulting power of frequency $f$ supplied to motor 6, will thus be dependent on the frequency of the output $f_o$.

Figure 2:
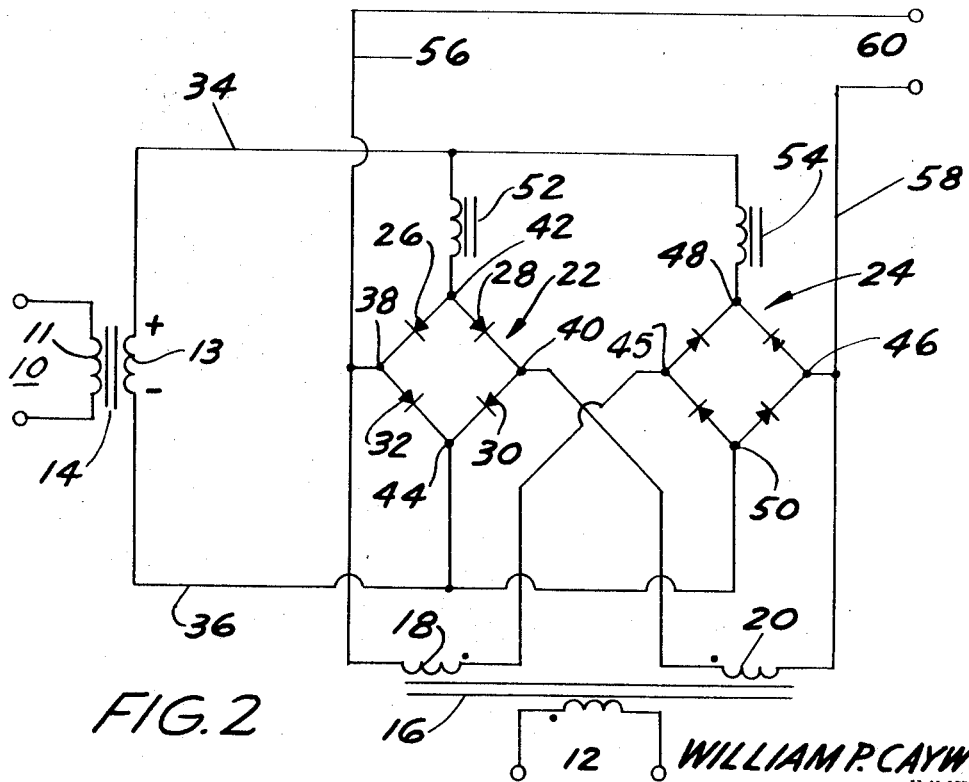
FIG. 2 is a circuit diagram of the preferred embodiment of the invention.

Referring now to FIG. 2, the demodulator 8 of FIG. 1 is shown in detail. A first input transformer is shown at 14 having a secondary winding 13 and a primary winding 11 to which the reference frequency input signal is supplied at 10. An isolating transformer 16 is provided with two secondaries 18 and 20 that supplies the signal frequency. The input signal frequency to transformer 16 is shown at 12.

The embodiment of the invention shown in FIG. 2 comprises two subcircuits 22 and 24 which are the demodulator bridge circuits for the system. Bridge circuit 22 includes diodes 26, 28, 30 and 32 connected in the respective arms of the bridge intermediate terminals 38, 40, 42 and 44. Bridge circuit 24 has diodes similarly arranged between terminals 45, 46, 48 and 50, however, the diodes in bridge 24 are poled opposite to the diodes contained in bridge 22, for a purpose which will be described hereinbelow. Connected in series between terminal 42 of bridge 22 and line 34 from the input transformer 14 is a choke coil 52. Similarly located in series with terminal 48 and line 34 from input transformer 14 is a choke coil 54. Choke coils 52 and 54 serve to isolate the loading effect of the two diode bridges upon each other. Lone 36 completes the circuit between bridges 22 and 24 and the input transformer 14.

As can be seen in FIG. 2, secondary winding 18 has one end connected to terminal 38 of bridge 22 and the opposite end connected to terminal 45 of bridge 24. Similarly, secondary winding 20 has one end connected to terminal 40 of bridge 22 and the other end connected to terminal 46 of bridge 24. Transformer 16 is dotted in a conventional fashion to indicate those terminals of the winding whose potentials rise and fall together. The output circuit 60 is connected to terminal 38 of bridge 22 via conductor 56 and to terminal 46 of bridge 24 via conductor 58.

In operation, reference frequency 10 and signal frequency input 12 will simultaneously be applied to input transformers 14 and 16. Assuming the polarity of the potential developed across secondary winding 13 is as shown in the drawings, a potential will be developed across terminals 42 and 44 of bridge 22 causing the diodes 26, 28, 30, and 32 to be forward biased. Consequently, a current is built up in coil 52, flowing through the diodes in their forward direction. The voltage drop in diodes 26, 28, 30 and 32 is negligible when they are conducting.

As can be seen in the drawing, however, the diodes of bridge 24 are poled opposite to that of those in bridge 22. Consequently, when a potential builds up on the secondary 13 of input transformer 14 as shown in the drawing, the positive potential at terminal 48 of bridge 24 causes the diodes of bridge 24 to be the reverse biased and hence in a nonconducting state. With the polarity as indicated, no current flows through either bridge 24 or its associated choke coil 54.

Secondary winding 20 of transformer 16 is shown as being firmly connected to output conductor 58 by direct connection. As soon as the diodes in bridge 22 start to conduct and hence have no substantial voltage drop across them, the other end of winding 20 appears to be firmly connected to output line 56 through the diodes 26, 28, 30 and 32. For the remainder of the half-cycle of the stated referenced polarity, when the end of winding 20 connected to terminal 40 is positive, current will be supplied to output 560 through diode 30, conductor 36, secondary winding 13, conductor 34, choke 52, diode 26, terminal 38, conductor 56, the load circuit, conductor 58, and then back to the other end of secondary winding 20. Assuming that the polarity of secondary winding 20 changes such that the end connected to terminal 40 is now negative while the polarity of the reference frequency input remains as stated, conduction will be through conductor 58, load 60, conductor 56, diode 32, conductor 36, secondary winding 13, conductor 34, choke coil 52, diode 28, terminal 40, and then back to the opposite end of winding 20. This will be the condition of the circuit for the remainder of half-cycle of the stated referenced polarity until the current through the diodes in bridge 22 stops.

In contrast, as soon as the polarity of the referenced voltage 10 reverses from that shown in the drawing of FIG. 2, and the current the diodes of bridge 22 has stopped, current starts to increase in the diodes of bridge 24 and choke coil 54. At this point, the apparent connection between winding 20 and the conductor 56 is severed due to the nonconduction of bridge 22. Conversely, however, the secondary winding 18 of transformer 16 is now connected to output circuit 60. At this juncture, one end of winding 18 appears to be firmly connected to output line 58 while the other end is firmly connected to output line 56 by direct connection. The specific current flow through the diodes of bridge 24 is similar to the operation of the bridge 22, explained above. Hence, for the remainder of the half-cycle of the new stated reference polarity of referenced frequency input transformer 14, and in fact until the current through the diodes of bridge 24 stops, this new apparent connection between the winding 18 and the output circuit 60 ensues.

To more fully describe the operation of the demodulator bridges 22 and 24, the action of the synchronous demodulator during one complete cycle of the waveform will be discussed in conjunction with FIG. 6. Waveform A in FIG. 6 designates the reference frequency $f_r$. Waveform B designates the wheel frequency which is the signal frequency $f_w$. The carrier signal $f_c$ is not shown in the plot of these waveforms for clarity purposes. Waveform C of FIG. 6 has been designated as the output frequency $f_o$ which has a frequency equal to the difference between the frequency of the input wave forms $f_r$ and $f_w$. The manner in which this is achieved will be described hereinbelow. As can be seen in waveform C, of FIG. 6, a slight ripple component shown at the area designated by 64 is superimposed upon the output signal $f_o$. This ripple component is the result of the summing of the two input frequencies $f_r$ and $f_w$. This ripple component is filtered out of the circuit as will be described hereinbelow. The time period for waveform B is arbitrarily chosen as being shorter than that of waveform A. For convenience, the input reference frequency $f_r$ has been shown as a sinusoidal waveform having a peak to peak amplitude of 20 units and a frequency of 1kHz. Waveform B is the second typical input frequency which was arbitrarily chosen as a sinusoidal input signal having a peak to peak amplitude of 20 units and a frequency of 1.25 kHz.

As has been described herein before the function of the reference signal frequency input $f_r$ is to switch the diode demodulator bridges into a conducting or nonconducting condition. For example, if the polarity of the referenced frequency input 10, is as shown in FIG. 2, diode bridge 22 will be in a conducting condition and this will thus connect the signal frequency input present at winding 20 on the signal frequency transformer 16 to the output circuit 60. Conversely, when the reference frequency input is opposite to that shown on the winding 13 of FIG. 2, diode bridge 22 will cease conducting and diode bridge 24 will be placed in a conducting condition and will connect the signal frequency input $f_r$ thus acting to switch diode bridges 22 and 24 to a conducting or nonconducting condition at the rate of a 1,000 times per second. During the 1,000 positive one-half cycles per second of the reference frequency input diode demodulator bridge 22 will conduct; during the 1,000 negative half-cycles per second of the reference frequency input, bridge 24 will conduct. During the periods of diode bridge conduction, the signal frequency $f_w$ is connected to the output terminals such that an output waveform C as shown in FIG. 6 will be at the output.

The fabrication of the output waveform C shown in FIG. 6, will now be described. During the time $t_o$ to $t_1$ as shown in FIG. 6, when the input signal frequency $f_r$ is in its positive half-cycle, the signal frequency $f_w$ present on winding 20 of the transformer 16 is connected to the output. The output voltage $f_o$ in wave form C will follow the signal frequency input $f_w$ from time $t_o$ to $t_1$, starting at zero voltage. During the time period $t_1$ to $t_2$ when the reference frequency $f_o$ is in its negative half-cycle, the reference frequency input appearing on winding 18 of transformer 16 will be connected to the output circuit 60 with reverse polarity. This reverse polarity signal, which occurs during time $t_1$ to $t_2$, is similarly shown plotted on the output waveform between reference frequency input $f_r$ is in its second positive half-cycle, the voltage appearing on line 20 of the transformer 16 is again connected to the output 60 in its proper polarity. It is shown on the output form C between reference numerals 68 and 70.

A continuation of this half-cycle plot of signal frequency input wave form section as they appear at the output has been made and is shown on the output waveform plot. From this plot, it may be seen that the frequency at the output is 0.25 kHz. which is the difference frequency of the reference and signal inputs. As described hereinbefore, it may be seen that a ripple component is contained on this output waveform which is equal to the summation of the reference and signal inputs, namely, 2.25 kHz. It should be also noted that the amplitude of the output signal is approximately 66 units peak to peak which represents the voltage gain through the synchronous demodulator of approximately 3.3.

Figure 3:
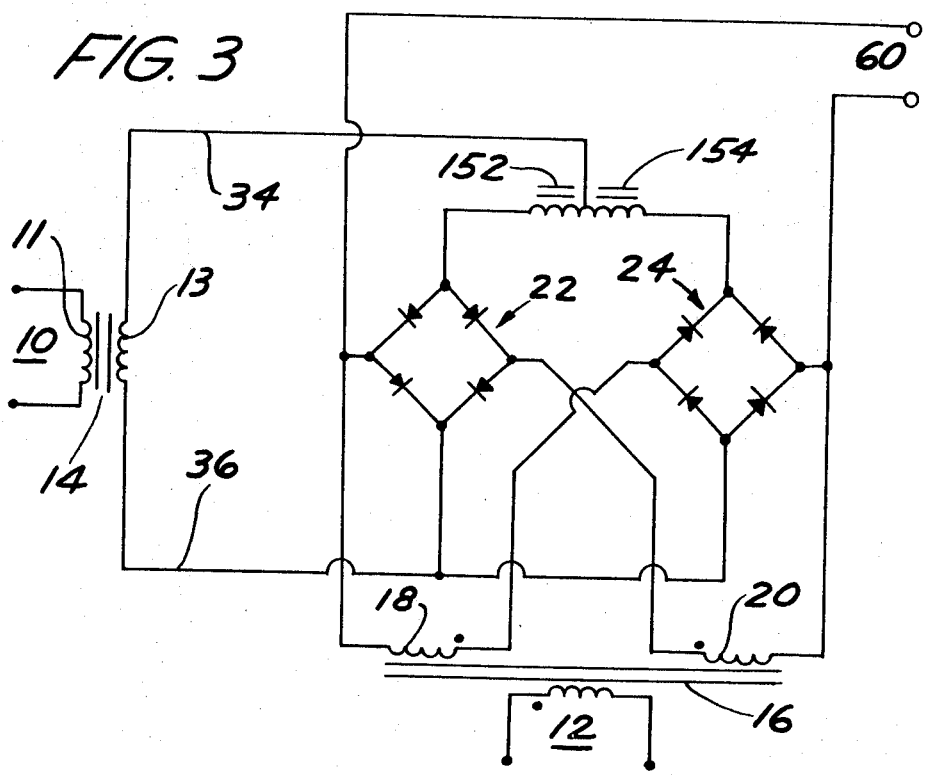
FIG. 3 illustrates a circuit diagram of a second embodiment of the invention.

Referring now to FIG. 3, a second embodiment of the invention is shown. It is similar to the embodiment disclosed in FIG.

2 with the exception of the two chokes 52 and 54 which are now replaced with a single core with two windings 152 and 154. It has been discovered that the operation of this second embodiment is similar to the first in that it displays an advantage of requiring less voltage of reference signal frequency input. A corresponding lowering of the active power of the reference frequency signal is required. Further, it has been discovered that the single inductance core which windings 152 and 154 are mounted to does not have to rebuff the direct current as it appears in the individual windings, and as a result may be made physically smaller than either core of coils 52 and 54 of the first embodiment. Satisfactory operation is obtainable with the smaller core, and no observerable saturation occurs. The operation of the circuit disclosed in FIG. 3 is otherwise generally similar to that described above in regards to the circuit disclosed in FIG. 2.

Figure 4:
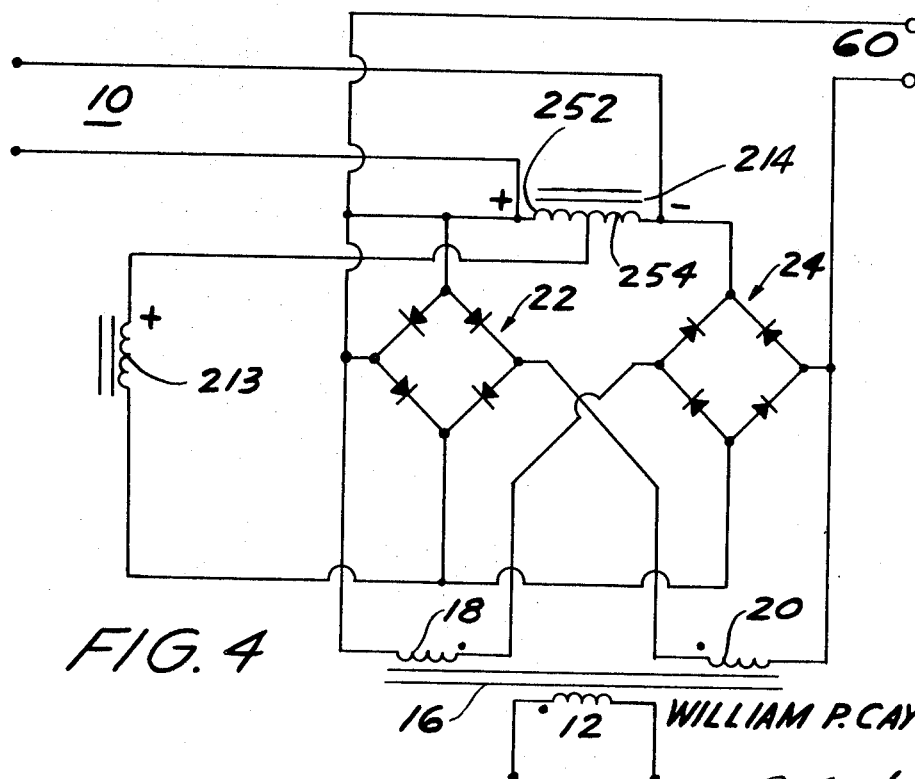
FIG. 4 illustrates a circuit diagram of a third embodiment of the invention.

FIG. 4 discloses a third embodiment of the invention wherein the reference frequency supply transformer 14 and the inductance 152 and 154 as disclosed in FIG. 3 are interchanged. As shown in FIG. 4, input transformer 214 has windings 252 and 254. Coil 213 is connected electrically to the midtap of the primary winding of transformer 214. As shown in the drawing, it is also magnetically coupled to the primary. Thus, coil 213 in conjunction with coils 252 and 254 function as an auto transformer. Thus, when the polarities of the primary and secondary 213 are as shown in FIG. 4, the diodes of bridge 22 will be forward biased and will conduct. The operation of the demodulator bridges in this embodiment is thus generally similar to the operation of the demodulator bridges described above in conjunction with FIGS. 2 and 3.

Figures 5, 6:
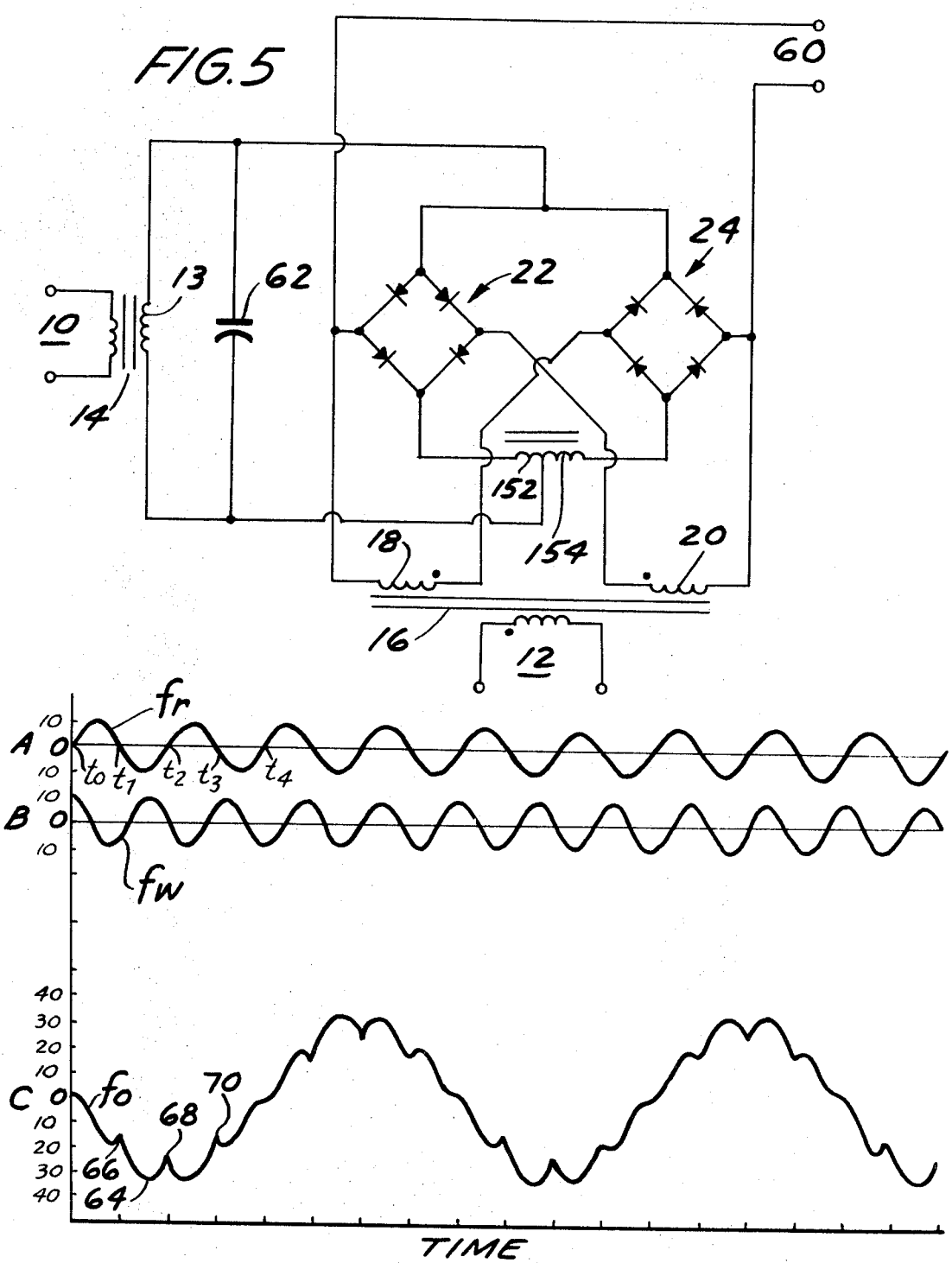
FIG. 5 is a circuit diagram of a fourth embodiment of the invention.
FIG. 6 is a plot of waveforms of the input signals to the circuit according to the invention and the resulting output signal.

Referring now to FIG. 5, a fourth embodiment of the invention is shown and is generally similar to that shown and described in relation to FIG. 3. In this circuit configuration, an additional component, a capacitance 62 has been inserted in parallel circuit relation with the secondary winding of the reference input transformer 14. Capacitance 62 serves to reduce the reactive power required of the reference signal frequency source 10. The reduction experience is a factor of 10 or more, making the requirements of the reference frequency generated much less stringent.

Thus, what has been described is a synchronous demodulator which when supplied at its two sets of input terminals with two signals of different frequencies develops at its output terminals a signal which includes a sum frequency and also includes a difference frequency of the two inputs. The resulting signals supplied to the load is that of signal frequency source except that the polarity of the connections is reversed at a rate equal to the reference signal frequency. Such action is synchronous demodulation in the usual meaning of the term. This circuit is a unique type of synchronous demodulator which is capable of accomplishing a desired algebraic summation of its frequencies making available as the fundamental output the difference between these two frequencies.

While the invention has been shown described in relation to 1,250 cycles per second, it should be understood that any suitable frequency could be used such as 5,000 cycles per second, for example.

I wish it to be understood that I do not desire to be limited to the exact details of construction shown and described, for obvious modifications will occur to a person skilled in the art.

What I claim is:

1. A synchronous demodulator comprising:
   first input means,
   second input means comprising transformer means having a primary winding,
   a first source for supplying alternating current at a first frequency to said first input means,
   a second source for supplying alternating current at a second frequency to said second input means,
   means connecting said second source with said primary winding,
   an output circuit,
   controlling means comprising first and second demodulating bridge circuits and connected to said first and second input means and said output circuit to provide an output signal having a fundamental frequency equal to the difference between the frequencies of said first and second sources to said output circuit,
   first and second secondary windings connected to said first and second bridge circuits,
   said first bridge circuit including first, second, third and fourth terminals,
   said second bridge circuit including fifth, sixth, seventh and eighth terminals,
   means connecting said first secondary winding to said first and fifth terminals,
   means connecting said second secondary winding to said second and sixth terminals, and
   means connecting said third, fourth, seventh and eighth terminals to said first input means whereby said first input means alternately renders each of said bridge circuits conductive while simultaneously rendering the other nonconductive.

2. A synchronous demodulator as set forth in claim 1 wherein said first demodulating bridge circuit comprises diodes connected in each leg to permit conduction when said first input source is of a first polarity and said second demodulating bridge circuit comprises diodes connected in each leg which are oppositely poled relative to the diodes in said first bridge to permit conduction when said first input source is of an opposite polarity.

3. A synchronous demodulator as set forth in claim 1 wherein said first input means comprises a first transformer having a primary to which said first source is connected and a secondary connected to said first and second bridge circuits.

4. A synchronous demodulator as set forth in claim 3 wherein said first transformer comprises an autotransformer having one end of the secondary winding connected to the midpoint of the primary winding, the bridge circuits alternately connecting the other end of said secondary winding of said first transformer in conductive relation with opposite ends of said primary winding depending upon the polarity of said input source.

5. A synchronous demodulator as set forth in claim 1 further comprising a first coil connected in series circuit relation with said first demodulating bridge circuit and said first input means and a second coil connected in series circuit relation with said second demodulating bridge circuit and said first input means.

6. A synchronous demodulator as set forth in claim 5 wherein said first and second coils are mounted on a single core thereby reducing the reactive power required of said first input source.

7. A synchronous demodulator as set forth in claim 6 wherein the first input means includes a first input transformer having primary and secondary windings and a capacitor is connected in parallel with said secondary winding of said first input transformer thereby reducing the reactive power required of said first input source.

8. A synchronous demodulator comprising:
   a first input transformer including
      a primary winding connected to a first input source of a first frequency and
      a secondary winding,
   a second input transformer including:
      a primary winding connected to a second input source of a second frequency and
      first and second secondary windings,
   a first demodulating bridge circuit having diodes connected between first, second, third, and fourth terminals,
   a second demodulating bridge circuit having diodes connected between fifth, sixth, seventh, and eighth terminals,
   first and second coils, and
   an output circuit,
   said first secondary of said second input transformer being connected to said second and sixth terminals, said second secondary of said second input transformer being connected to said first and fifth terminals,
said third and fourth terminals being connected to said secondary winding of said first input source through said first coil,
said seventh and eighth terminals being connected to said secondary of said first input source through said second coil,
said output circuit being connected to said first and sixth terminals,
said diodes of said first bridge being poled so as to be forward biased when said first input source is of a first polarity,
said diodes of said second bridge circuit being poled so as to be forward biased when said first input source is of an opposite polarity thereby alternately rendering said bridge circuits conductive so as to produce an output signal having a fundamental frequency equal to the difference between the frequencies of said first and second input sources.